Feb. 4, 1969 W. H. SLAVIK 3,426,242
TELEVISION RECEIVER
Filed May 19, 1965
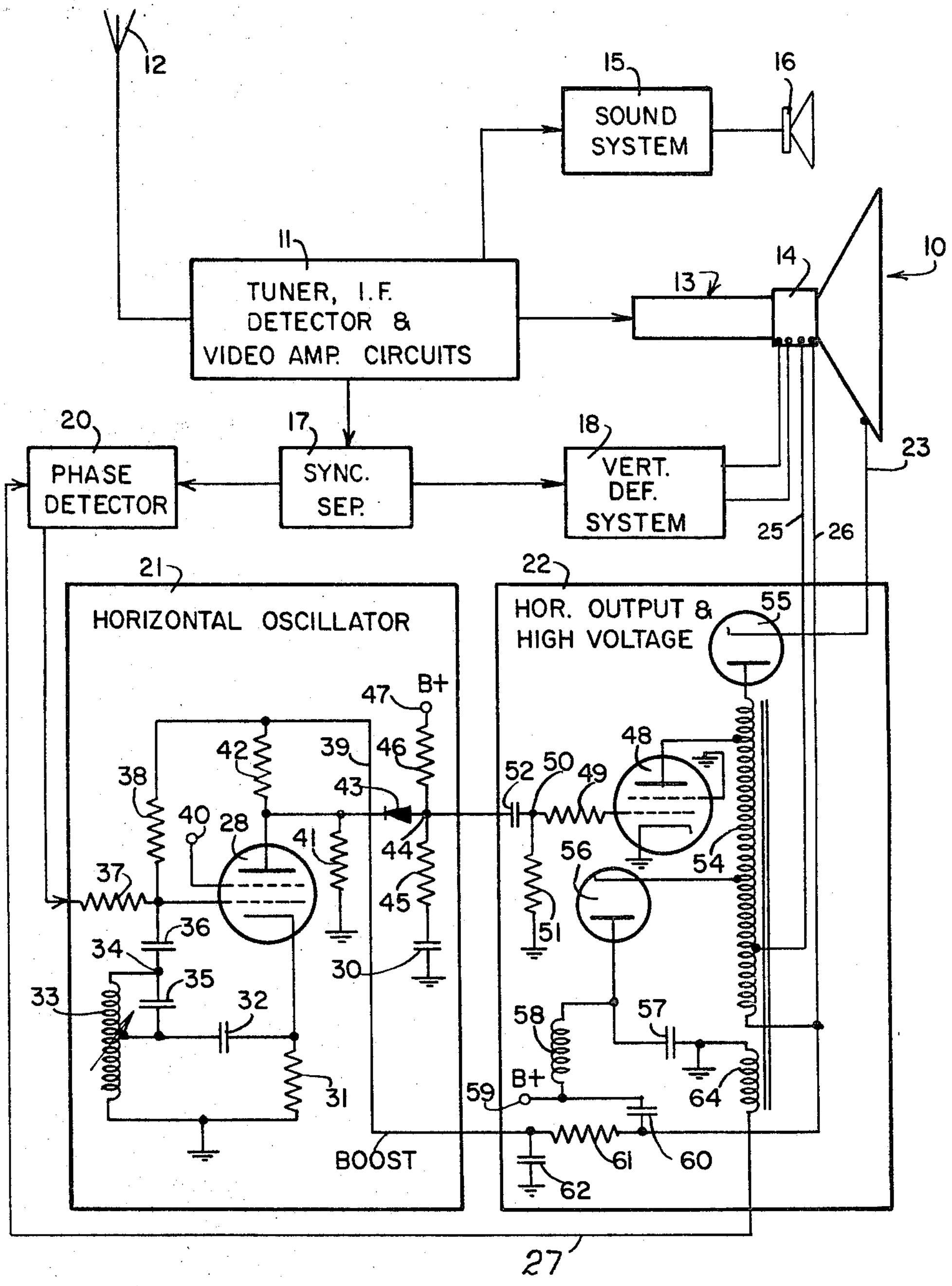
Inventor
WILLIAM H. SLAVIK
BY
Mueller, Aichele & Rauner
ATTYS.

3,426,242

TELEVISION RECEIVER

William H. Slavik, Oak Lawn, Ill., assignor to Motorola, Inc., Franklin Park, Ill., a corporation of Illinois Filed May 19, 1965, Ser. No. 457,118

U.S. Cl. 315—27 5 Claims

Int. Cl. H01j *29/70*

ABSTRACT OF THE DISCLOSURE

A television sweep system includes an output stage and a synchronized driven stage with a diode device coupled between the stages. The device is normally cutoff but driven into conduction after start of the development of control pulses in the driver stage to reduce the time for cutting off the output stage.

This invention relates to a horizontal drive circuit and more particularly to improvements in a circuit designed for energizing horizontal deflection coils and a fly-back high voltage supply in a television receiver, although features of the circuit have other applications. The circuit improvements are relatively simple and inexpensive, but result in increased reliability and higher efficiency with less power dissipation.

Horizontal drive circuits have heretofore been provided wherein a capacitor is gradually charged and rapidly discharged to produce a saw-tooth voltage which is applied to the grid of an output tube coupled to horizontal deflection coils and to a fly-back high voltage supply. In one particular circuit heretofore proposed, the capacitor is connected to the plate or anode of a control tube at which current pulses are developed at the horizontal line rate, by means of a horizontal oscillator circuit.

Although the operation of such a circuit was found to be generally satisfactory, it was discovered that the horizontal output tube was running much hotter than would be expected from a calculation of the power dissipation during scan time, and it was surmised that the power dissipated in the tube must be occurring at times other than the scan time. A point by point dissipation measurement was made covering the turn-off time interval, i.e. the time interval during which the cathode current changed from its maximum value to zero. In a particular case, it was found that the turn-off time was 3.5 microseconds and that the average dissipation over the 3.5 microsecond turn-off interval was 190 watts which when averaged over a complete cycle or line interval, means an average of 10.5 watts.

Further examination of the conditions of operation of the circuit revealed that during the initial part of the turn-off time interval, the voltage applied to the grid of the output tube dropped only a relatively small amount, while at the same time the plate voltage was quite high since, according to Lenz's law, the plate voltage rises as soon as the plate current starts to decrease. Accordingly, the instantaneous power dissipation was quite high and was maintained high over a substantial time interval.

This invention was evolved with the general object of reducing power dissipation in the horizontal output tube and otherwise improving performance of a horizontal drive circuit.

A specific object of the invention is to provide an improved saw-tooth wave generating circuit operative to generate a saw-tooth wave having a very short fall time.

Another object of the invention is to provide an improved saw-tooth wave generating circuit wherein a capacitor is discharged by a tube controlled from a sine wave oscillator circuit, while having a very short fall time.

A further object of the invention is to provide a saw-tooth wave generating circuit having improved performance characteristics while being relatively simple and inexpensive in construction.

According to this invention, a saw-tooth wave generating circuit is provided having a very short fall time which is highly advantageous when applied in a horizontal drive circuit of a television receiver in that it minimizes power dissipation in the horizontal output tube during the turn-off time interval.

In particular, a uni-directional conduction device or diode is provided between the capacitor of a saw-tooth circuit and an output terminal of a control amplifier device and is operative to permit conduction through the amplifier device and to discharge the capacitor, only during peak portions of pulses of current flow through the amplifier device. With this comparatively simple and inexpensive feature, it is possible to obtain a great improvement in operation, with a reduction in the fall time to a fraction of that obtained without the diode in the circuit.

According to a specific feature of the invention, the output electrode or terminal of the control amplifier device which is connected through the diode to the capacitor, is connected through resistance means to a relatively high DC voltage source, to further ensure conduction only during the peaks of the current pulses. In a television receiver, the relatively high DC voltage may be obtained from a boost voltage output of the fly-back circuit.

In accordance with another specific feature of the invention, the control amplifier device may have sine wave oscillator means associated therewith. Specifically, the control device may be a tetrode or pentode wherein the oscillator circuits are connected to the cathode, control grid and screen grid, the screen grid being operated as a plate or anode with regard to the operation of the oscillator, with pulses of anode current being developed during peak portions of the sinusoidal oscillations through electron coupling between the screen grid and the anode.

This invention contemplates other and more specific objects, features and advantages which will become more fully apparent from the following detailed description taken in conjunction with the accompanying drawing which illustrates a preferred embodiment and in which the single figure is a schematic circuit diagram of a television receiver incorporating a horizontal drive circuit constructed according to the principles of this invention.

Referring to the drawing, reference numeral 10 generally designates a television receiver which comprises conventional tuner, I.F. amplifier, detector and video amplifier circuits 11 for receiving an input signal from an antenna 12 and applying a resultant video signal to a conventional picture tube 13 having a deflection coil assembly 14. It will be understood that the invention can be applied to both color and monochrome receivers.

Circuits 11 also apply a signal to a sound system 15 connected to a speaker 16.

A synchronizing signal separating circuit 17 is provided which responds to a signal from the circuits 11 to develop a vertical synchronizing signal which is applied to a vertical deflection system 18 connected to the vertical deflection coils of the assembly 14.

The synchronizing signal separator circuit 17 also develops horizontal synchronizing pulses which are applied to one input of a phase detector 20 which applies a control signal to a horizontal oscillator circuit 21. The horizontal oscillator circuit 21 develops a saw-tooth signal which is applied to a horizontal output and high voltage circuit 22, operative to develop a high voltage on a line 23 connected to the screen of the picture tube 13, and also operative to develop a horizontal deflection signal on lines 25 and 26 connected to the horizontal deflection coils of the deflection coil assembly 14. A signal is applied through line 27 from the horizontal output and high voltage circuit 22 to the phase detector circuit 20 which compares that signal and the signal from the synchronizing signal separating circuit 17 to automatically control the operation of the horizontal oscillator 21 and to maintain synchronization.

The illustrated horizontal oscillator circuit 21 comprises a tetrode vacuum tube 28, with the cathode, control grid and screen grid being connected to operate as a sine wave oscillator and arranged to develop current pulses in the plate or anode circuit, at the peaks of the sinusoidal oscillation, through electron coupling between the screen grid and the anode, such pulses being used to discharge a capacitor 30.

In particular, the cathode of the tube 28 is connected through a resistor 31 to ground and through a capacitor 32 to a tap of an adjustable oscillator coil 33 which is connected between ground and a circuit point 34, with a capacitor 35 connected between circuit point 34 and the tap of coil 33 and with a capacitor 36 connected between circuit point 34 and the control grid of the tube 28.

The control grid of the tube 28 is additionally connected through a resistor 37 to the output of the phase detector circuit 20 and through a resistor 38 to a line 39 which is connected to a relatively high voltage boost source in the horizontal output and high voltage circuit 22.

The screen grid of the tube 28 is connected to a voltage supply terminal 40 while the plate or anode thereof is connected through a resistor 41 to ground and through a resistor 42 to the line 39.

In operation, the cathode, control grid and screen grid of the tube 28 together with the inductor 33, capacitors 32 and 35 and associated elements form an oscillator circuit having a free running frequency which is controlled by adjustment of the inductor 33, the manual adjustment thereof forming a horizontal "hold" control for the receiver. The exact frequency of operation is, however, controlled from the control signal applied from the phase detector circuit 20 through the resistor 37 to the control grid of the tube 28, which operates to control the effective reactance in the oscillator circuit and to automatically adjust the frequency of operation into synchronization with the horizontal synchronizing pulses of the received television signal.

During positive peaks of the sine wave signal developed at the control grid of the tube 28, current pulses flow through the screen grid-cathode circuit of the tube 28 and through electron coupling, corresponding pulses are developed in the anode-cathode circuit.

The anode is normally at a relatively high potential as determined by the potential of the line 39 and the voltage-dividing ratio of the resistors 41 and 42, but during such pulses, the potential of the anode is dropped to a very low value.

In accordance with this invention, the anode of the tube 28 is connected through a uni-directional device or diode 43 to a circuit point 44 which is connected through a resistor 45 and through the capacitor 30 to ground and which is connected through a resistor 46 to a power supply terminal 47. The term "diode" is used herein in a generic sense to include any form of device which blocks or presents a relatively high impedance to current flow in one direction while presenting a relatively low impedance to current flow in the reverse direction.

In operation, the capacitor 30 is gradually charged through current flow through resistors 45 and 46, but during the peaks of the current pulses at the anode of the tube 28, the potential of the anode drops to a value less than that of the circuit point 44, and the capacitor 30 is rapidly discharged through current flow through resistor 45, diode 43, the anode-cathode path of the tube 28 and the resistor 31. It is very important that because of the provision of the diode 43, the discharge of the capacitor 30 does not start to take place during the initial portions of the current pulses developed at the anode of the tube 28. In such initial portions of such current pulses, the change in current is relatively slow, but is followed by a rapidly changing portion between the initial relatively slowly changing portion and the pulse peak. If a direct connection were substituted for the diode 43, such slowly changing initial portions of the pulses would round off the wave form produced at the circuit point 44, and the fall time of the saw-tooth wave would be of substantial duration. However, with the diode 43 in the circuit, the capacitor 30 can be discharged only during the peak portions of the pulses, and a very short fall time is obtained.

This feature is very important in a television receiver of the type illustrated, having a circuit such as the circuit 22 operative as both the horizontal output circuit and as a fly-back high voltage circuit. As diagrammatically illustrated, the circuit 22 comprises a tube 48 having a cathode connected to ground and a control grid connected through a resistor 49 to a circuit point 50 which is connected through a resistor 51 to ground and through a coupling capacitor 52 to the circuit point 44, the saw-tooth wave signal developed at the circuit point 44 being thereby applied to the control grid of the tube 48. The anode of the tube 48 is connected to a tap of a transformer winding 54 having one end connected to the anode of a high voltage rectifier tube 55 having a cathode connected to the line 23. Another tap of the winding 54 is connected to the cathode of a damper tube 56 having an anode connected through a filter capacitor 57 to ground and through a filter choke 58 to a power supply terminal 59.

Line 25, connected to the deflection coil assembly 14, is connected to an additional tap of the winding 54 while line 26 is connected to an end terminal which is connected through a capacitor 60 to the terminal 59, to develop a boost voltage, applied to the line 39 through a decoupling filter including a resistor 61 and a capacitor 62. An additional winding 64, inductively coupled to the winding 54, is connected at one end to ground and at the opposite end to the line 27 to develop a signal for comparison with the horizontal synchronizing signal by the phase detector circuit 20.

It is noted that the boost voltage developed on the line 39 is preferably several times higher than the maximum voltage developed at the circuit point 44, to insure that the diode 43 is rendered conductive to discharge the capacitor 30, only during the peak portions of the current pulses developed at the anode of the tube 28. It may further be noted that the diode 43 serves to isolate the anode circuit of the horizontal oscillator tube 28 from the charging circuit for the capacitor 30, so that variations in the operation of the tube and variations in operating voltages supplied thereto do not affect the charging of the capacitor 30 and the linearity of the saw-tooth signal.

By way of illustrative example, and not by way of limitation, the circuit components may have the following values:

| Reference numeral: | | Value |
|---|---|---|
| 30 | micro-microfarads | 220 |
| 31 | ohms | 2200 |
| 32 | microfarads | 0.022 |
| 35 | do | 0.0068 |
| 36 | micro-microfarads | 470 |
| 37 | ohms | 270,000 |
| 38 | megohms | 18 |
| 41 | do | 8.2 |
| 42 | do | 1 |
| 45 | ohms | 56,000 |
| 46 | do | 82,000 |
| 49 | do | 56 |
| 51 | do | 270,000 |
| 52 | microfarads | 0.005 |
| 60 | do | 0.1 |
| 61 | ohms | 47,000 |
| 62 | microfarad | 1 |

The tube 28 may be one section of a type 6GH8, the tube 48 may be a type 6JS6 and the damper diode 56 may be a type 6DW4.

Using such values and types of components, the turn-off time may be reduced from approximately 3.5 microseconds to approximately 0.7 microsecond, using the circuit of this invention. The power dissipation in the turn-off time, averaged over a cycle, may be cut from 10.5 watts to approximately 0.8 watt and the cathode current in the tube 48 may be decreased from an average of 259 milliamperes to 229 milliamperes. In addition to reducing current and power dissipation in the output tube 48, the circuit also functions to reduce current and power dissipation in the damper diode 56. Still another advantage of the invention is that the retrace time is substantially shortened.

Accordingly, the circuit of this invention provides a more efficient horizontal sweep and high voltage system with less dissipated power in the tubes, and also increases the reliability thereof.

It will be understood that modifications and variations may be effected without departing from the spirit and scope of the novel concepts of this invention.

I claim as my invention:

1. In a saw-tooth wave generating circuit, DC source means, a vacuum tube including a cathode, an anode, and control and screen grids, impedance means coupling said cathode, said anode and said screen grid to said DC source means, sine wave oscillator circuit means coupled to said cathode in said control and screen grids to generate a sinusoidal oscillation while developing pulses of anode current during peak portions of said sinusoidal oscillation through electron coupling between said screen grid and said anode, a capacitor, resistance means coupling said capacitor to said DC source means for gradually charging said capacitor, and a diode between said capacitor and said anode for discharging said capacitor during peak portions of said pulses of anode current.

2. In a television receiver including a picture tube having horizontal deflection coils, a fly-back high voltage supply for said picture tube, a horizontal output amplifier device for operating said high voltage supply and said deflection coils, means for applying a saw-tooth voltage to said horizontal output amplifier device including a capacitor and resistance means for charging said capacitor, horizontal oscillator means for developing current pulses at the horizontal rate, and means for applying said current pulses to said capacitor for discharging said capacitor including a diode conductive only during peak portions of said pulses to reduce the fall time of the saw-tooth voltage and to reduce the power dissipation through said output amplifier device.

3. In a television receiver including a picture tube having horizontal deflection coils, a fly-back high voltage supply for said picture tube, a horizontal output tube for operating said high voltage supply and said deflection coils, means for applying a saw-tooth voltage to said horizontal output tube including a capacitor and resistance means for charging said capacitor, a control tube having an anode, horizontal oscillator circuit means for developing current pulses at said anode at the horizontal line rate, and a diode between said anode and said capacitor for discharging said capacitor only during peak portions of said current pulses.

4. In a television receiver including a picture tube having horizontal deflection coils, a fly-back high voltage supply for said picture tube, DC source means for supplying a B-voltage, a horizontal output tube operated from said B-voltage for operating said high voltage supply and said deflection coils, means for applying a saw-tooth voltage to said horizontal output tube including a capacitor and resistance means for charging said capacitor from said DC source means, a control tube having an anode, means in said fly-back high voltage supply for developing a DC boost voltage substantially higher than said B-voltage, resistance means for applying said DC boost voltage to said anode, horizontal oscillator circuit means associated with said control tube for developing current pulses at said anode at the horizontal line rate and to drop the voltage of said anode from a value close to that of said DC boost voltage to a very low value, and a diode connected between said capacitor and said anode for discharging said capacitor during peak portions of said pulses.

5. In a television receiver including a picture tube with deflection field producing means operative at a horizontal deflection frequency and direct current potential supply means with high and low voltage sources, a deflection signal generating circuit for operation with reduced power consumption, including in combination, a horizontal output circuit coupled to said deflection field producing means and including an electron control device and an input circuit coupled thereto, said input circuit including a first resistor network coupled to the low voltage source and capacitor means coupled to said electron control device, an oscillator circuit operative at the horizontal deflection frequency to develop control pulse signals for cutting off said control device, said oscillator circuit including a second resistor network coupled to the high voltage source, and a unidirectionally conductive device coupled between said first and second resistor networks to be normally cut off by the potential therebetween, said device poled to conduct said pulse signals following the initiation thereof and said pulse signals overcoming the cutoff voltage established across said device.

References Cited

UNITED STATES PATENTS

| | | | |
|---|---|---|---|
| 2,884,525 | 4/1959 | Sippach et al. | 328—181 X |
| 2,846,582 | 8/1958 | Spracklen | 328—181 X |

RODNEY D. BENNETT, *Primary Examiner.*

CHARLES L. WHITHAM, *Assistant Examiner.*

U.S. Cl. X.R.

328—181